United States Patent [19]

Ligorati et al.

[11] 4,148,755

[45] Apr. 10, 1979

[54] ZIEGLER CATALYSTS

[75] Inventors: Ferdinando Ligorati, Usmate; Renzo Invernizzi; Carlo Collu, both of Milan; Maurizio Fontanesi, Concorezzo, all of Italy

[73] Assignee: Euteco S.p.A., Milan, Italy

[21] Appl. No.: 840,188

[22] Filed: Oct. 6, 1977

[30] Foreign Application Priority Data

Oct. 19, 1976 [IT] Italy .............................. 28519 A/76

[51] Int. Cl.$^2$ ............................ C08F 4/02; C08F 4/64
[52] U.S. Cl. ................................. 252/429 C; 252/430; 526/129; 526/156
[58] Field of Search ............................ 252/429 C, 430

[56] References Cited

U.S. PATENT DOCUMENTS

| | | | |
|---|---|---|---|
| 3,054,754 | 9/1962 | Lasky | 252/429 C |
| 3,072,633 | 1/1963 | Cawthon et al. | 252/429 C X |
| 3,166,542 | 1/1965 | Orzechowski et a. | 252/429 C X |
| 3,400,084 | 9/1968 | Fukumoto et al. | 252/429 C |
| 3,705,886 | 12/1972 | Kashiwa et al. | 252/429 C X |
| 3,950,316 | 4/1976 | Witt | 252/430 X |
| 3,978,031 | 8/1976 | Reginato et al. | 252/429 C X |

*Primary Examiner*—Patrick Garvin
*Attorney, Agent, or Firm*—Sughrue, Rothwell, Mion, Zinn and Macpeak

[57] ABSTRACT

Ziegler catalytic system comprising an organo-metallic compound of a metal of Groups I to III of the Periodic System and a compound of a heavy metal of Groups IV to VI supported on an alumina carrier, the latter being an activated amorphous alumina containing from 0.3 to 30% by weight of salts of aluminum with oxygenated inorganic anions, or of a mixture of the latter with salts of aluminum with non-oxygenated inorganic anions, said carrier being prepared by precipitating an alumina gel at a pH value of 7–10, introducing the inorganic anions into said gel, drying said gel and calcining the resulting amorphous alumina at 250°–700° C.

8 Claims, No Drawings

ZIEGLER CATALYSTS

The present invention relates to Ziegler catalysts for use in the homo- and copolymerisation of olefines by means of processes using low reaction pressures.

It has been known for some time that olefines can be polymerised by low pressure processes by making use of Ziegler catalysts.

The catalysts used are obtained by reacting one or more compounds of a transition element belonging to Groups IV to VI of the Period System with an activator consisting of one or more organo-metallic compounds of elements belonging to Groups I to III of the Periodic System. The process is generally carried out in suspension, in solution, or in the gaseous phase.

Subsequently, processes have been discovered in which the components of the catalyst are used in combination with a support.

For example, according to the French Patent No. 1,198,422, compounds of metals belonging to Groups IV to VI of the Periodic System are fixed on supports such as bentonite, pumice, silica gel, calcium phosphate, and are then activated by reduction with organo-aluminum compounds. According to this Patent, polymerisation proceeds independently of the composition of the support. The only important fact, therefore, is the composition of the catalyst fixed on the support. A great disadvantage consists, moreover, in the necessity of removing catalytic residues and the support from the polymer produced before the latter can be utilised.

Numerous subsequent Patents relate to the use of supports which also play an active role in the catalysis; these have to be of a specific and exactly determined nature and composition. For example, the Belgian Patent No. 609,261 uses phosphates of alkaline earth metals. However, the latter must be heated even up to 1000° C. before they can be made to react with titanium or vanadium compounds, in order to acquire sufficient catalytic activity for polymerisation. In spite of this the polymer yields obtained are very low.

Another series of Patents relates to the use of alumina supports. Generally these are prepared from various types of hydrated mineral aluminas which are then calcined to obtain the final anhydrous, crystalline aluminas, characterised by well defined and critical properties. For example, German Patent No. 1,214,653 claims a process for preparing supported catalysts in which certain compounds of heavy metals from Groups IV to VIII of the Periodic System are made to react, for example, with a pyrogenic alumina support, the surface of which contains hydroxyl groups. The average size of the support particles must be less than about 0.1 microns, and the concentration of hydroxyl groups must be high enough for them to be able to react with at least $1 \times 10^{-4}$ equivalents of the transition metal per gram of support.

Moreover the polymerisation yields are so low, even when the pressures are raised up to 190 atmospheres, that it is essential to purify the polymers obtained from the catalyst and from the support.

It is also very tedious to obtain alumina by other means. For example, in the French Patent No. 1,516,139, the alumina to be used as a support is made by preparing sodium aluminate by reaction between aluminium and soda and treating a solution of this aluminate with gaseous carbon dioxide until hydrated crystalline alumina is obtained which is washed and dried at 120° C. The bayerite thus obtained is then calcined at 500° C. In this case, too, apart from the difficulties of the various stages of the process for preparation of the support, the polymerisation yields are also not very high.

We have now surprisingly found that improved results can be obtained by using a support consisting of alumina of special, excellent properties, which contains in an intimate mixture inorganic anions which modify and improve certain of its morphological characteristics and act as synergists to increase its activity as a catalytic constituent to a very high degree.

Thus, the invention provides a Ziegler catalytic system formed by the combination of an organo-metallic compound of a metal of Group I, II or III of the Periodic System of the Elements according to Mendeleef and a compound of a heavy metal of Group IV, V or VI, of said Periodic System supported on an alumina carrier, wherein the carrier is an activated amorphous alumina containing from 0.3 to 30% by weight of one or more salts of aluminium with oxygenated inorganic anions or of a mixture of the latter with one or more salts of aluminium with non-oxygenated inorganic anions, said activated amorphous alumina being prepared by precipitating aluminium hydroxide gel from a solution of aluminium salt at a pH value of from 7 to 10, introducing said inorganic anions into said gel by coprecipitation with and/or further addition to the latter, in such conditions as to ensure in the alumina a content of inorganic anions of from 0.2 to 25% by weight and a content of cations other than aluminium of less than 0.25% by weight, the permanence time of the gel under moist conditions being less than 12 hours, drying the gel and activating the resulting amorphous alumina by calcination at a temperature of from 250° to 700° C.

According to another aspect of the invention there is provided a process for the homo- or co-polymerization of olefins having from 2 to 10 carbon atoms per molecule, by the low pressure Ziegler method, in the presence of the above catalytic system.

The preferred oxygenated inorganic anions are the sulphate, phosphate, chlorate, perchlorate and halogensulphonate anions. The preferred non-oxygenated inorganic anions are the halogen anions.

The support used in the catalyst of the invention may be prepared by various simple methods. One important point, common to all the methods of preparation, is, nevertheless, that the oxygenated inorganic anions must already be present in the alumina, or are added to it, when it is still in the state of aluminium hydroxide in the form of a gel. In this way the oxygenated anions are able to modify certain characteristics of the aluminium hydroxide effectively. As a result the final alumina has excellent properties.

A similar argument also holds good for the non-oxygenated inorganic anions. These may already be present, or may be added at the same time as the oxygenated inorganic anions, or subsequently but always when the alumina is still in the state of aluminium hydroxide in the form of a gel. In this way they are able to develop a synergic action which further improves the activity of the final alumina.

The excellent results obtained by the action of the inorganic anions on the aluminium hydroxide gels are surprising. The mechanism of the action of the inorganic anions has not, as yet, moreover, been completely explained. It is most probable that they induce molecular distortions in the aluminium hydroxides which last even after calcination of the alumina, and impart to the final alumina special characteristics of absorption of the Ziegler catalysts which raise the activity of the catalytic system to a very high degree.

Bearing in mind what has been said above, the precipitation of the gel and the introduction of the inorganic anions into said gel may be carried out according to a large number of procedures. A few will be described, purely by way of illustration:

(a) Use of an aluminium salt, the anion of which is that required, and its precipitation by means of a base, such as a hydroxide or carbonate of Na or $NH_4$. The preselected chemical and chemico-physical characteristics of the precipitated gels can be obtained by appropriate control of parameters such as the pH, the temperature and the number and type of washings.

(b) Precipitation of the hydroxide from a salt of aluminium with any anion, washing of the precipitate until the anion has disappeared, and introduction of the desired anion by treating the gel with an acid solution of said desired anion.

(c) Acidification of a solution of sodium aluminate with an acid solution of the desired anion.

By combining the methods referred to hereinbefore two or more inorganic anions can also be introduced into the aluminium hydroxide gels. For example, a gel of aluminium hydroxide may be precipitated from an aluminium sulphate solution at such a pH that the gel incorporates a predetermined percentage of sulphate anions. By subsequently treating the gel with hydrofluoric acid, fluorine anions are introduced which add a further synergic action to that already given by the sulphate anions present in the gel.

Regarding the precipitation of the aluminium hydroxide gels, this can be carried out at a pH value of from 7 to 10, and preferably from 7.5 to 8.5. In fact, as will be shown further on, the use of very high pH values leads to supports with reduced activity, almost certainly because it tends to increase the degree of crystallinity.

The range of temperatures which can be used for the said precipitations is very wide, and not restrictive. Usually temperatures of between 10° C. and 90° C., and preferably between 20° C. and 50° C. are used.

An important factor in the preparation of the supports for use in the catalyst of the invention, is the manufacture of amorphous aluminas.

These prove much more efficacious and active than similar aluminas having a certain degree of crystallinity.

In the preparation process of the support, amorphous aluminas are obtained as long as the time for which the aluminium hydroxide gels stay in the mother liquor and/or in the washing waters before they are dried is not excessively long. As will be demonstrated further on, too prolonged a period of stay under moist conditions in fact induces "maturing" of the gels and gives rise to an increasing degree of crystallinity, with the negative effects, already referred to, on the characteristics and activity of the final alumina which is then obtained.

It is therefore appropriate to operate in such a way that the said period of stay of the gels under moist conditions, either in the mother liquor or in the washing waters, does not exceed 12 hours and preferably, 4 hours.

The aluminium hydroxide gels described above must obviously be subjected to drying and to calcination in order to obtain the desired anhydrous aluminas.

The calcination conditions are not critical neither as to the duration, nor the pressure, nor the gaseous atmosphere in which calcination is carried out. The calcination temperature may range within a relatively wide range of values, normally from 250° C. to 700° C. As a heating temperature gradient to reach the calcination temperatures, for example, that of 50° C./h may be chosen.

The aluminas used as supports in the catalyst of the invention have, as already stressed, the particular, most important, characteristic of being amorphous.

They have an inorganic anion content of from 0.2 to 25% by weight, and preferably from 1.5 to 15% by weight. The content of cations (other than Al) is less than 0.25% by weight and preferably less than 0.1% by weight.

Other characteristics are similar to those of the aluminas which have been described in literature. The volume of pores is generally from 0.8 to 2 ml/g, and preferably from 1.2 to 2 ml/g. The surface area is generally from 100 to 400 m$^2$/g, and preferably from 200 to 300 M$^2$/g. The bulk density (non-compacted product) is generally from 0.2 to 0.8 g/ml, and preferably from 0.2 to 0.4 g/ml.

The size of the particles to be used as a support is not critical. It is, however, preferable to use particles having an average diameter of from 20 to 400 microns and preferably from 40 to 200 microns.

In the preparation of the catalytic system of the invention, the alumina support is first contacted with a compound of a heavy metal from the IVth to the VIth Group of the Periodic System. This compound is preferably a compound of titanium, vanadium or chromium. The best results are generally obtained with titanium compounds.

The said compounds can be of various types, such as halides, oxyhalides and alkoxyhalides. The best results are obtained with $TiCl_4$.

The operation conditions under which the reaction between the alumina support and the said compound is carried out are not critical. The said compound may for example, be used in the gaseous or the vapour state, either pure, or diluted with an inert gas; alternatively it can be used in the liquid state, or in solution. As solvents hydrocarbon solvents conventionally used for the low pressure polymerisation of the olefines may generally be used.

Preferably, the alumina support is suspended in the said compound, pure and in the liquid state, or else the support can be washed with the said compound also in pure form and in the liquid state.

The temperature and pressure of the reaction are not critical factors. The reaction may, for example, be carried out at atmospheric pressure and at temperatures of from 50° C. to 130° C., and preferably from 100° C. to 130° C. The contact time between the alumina support and the aforesaid compound is generally from 0.5 to 5 hours, and preferably from 1 to 2 hours.

The reaction product is generally washed, firstly with the heavy metal compound which has been used in the reaction, and subsequently with an inert hydrocarbon solvent, in order to remove the excess of heavy metal compound which has not been fixed to the alumina support. The ultimate analysis carried out on the resulting catalyst component, after washing, shows that the heavy metal content is usually from 0.4 to 3% by weight with respect to the support.

The catalytic system according to the present invention includes also, as already stated above, an organo-metallic compound of a metal from the Ist to the IIIrd Group of the Periodic System: for example, a compound of lithium, magnesium, aluminium or zinc. The best results are obtained with alkylaluminium compounds and alkylaluminium halides, such as trimethylaluminium, triethylaluminium, triisobutylaluminium, diethylaluminium monochloride or monoethylaluminium dichloride. The best results are obtained with triethylaluminium and with triisobutylaluminium.

The catalyst of the present invention can be applied to the homo- or copolymerisation of olefines containing from 2 to 10 atoms of carbon per molecule; for example ethylene, propylene, 1-butene, 1-pentene, 1-hexene and 4-methyl-1-pentene. It is particularly advantageous when it is used for the preparation of homo- or co-polymers of ethylene.

The homo- or co-polymerisation of olefines can be carried out according to any of the conventional methods, either in the gaseous phase or in solution. In the second case, use is made of inert solvents, preferably aliphatic or cycloaliphatic hydrocarbons such as butane, pentane, hexane, heptane, cyclohexane, either alone or mixed together. The polymerisation pressure is generally from atmospheric pressure to $50Kg/cm^2$. The temperature is usually from 40° C. to 170° C., preferably from 80° C. to 130° C.

The organo-metallic compound and the aforesaid catalytic component can be introduced into the polymerisation reactor either separately, or they can be reacted previously by first placing them in contact with each other, generally for a period of from 15 to 120 minutes.

The quantity of organo-metallic compound used is not critical; however, the said compound should preferably be present in molar excess with respect to the heavy metal from the IVth to the VIth Group of the Periodic System present on the support. As an indication, for example, in the case of a catalyst prepared from triethylaluminium and $TiCl_4$, from 10 to 30 moles of alkylaluminium may be used for each gram atom of Ti.

The quantity of the catalytic component, obtained by reaction of the support with the compound of a heavy metal of the IVth to the VIth Group of the Periodic System, may vary within a wide range according to the parameters chosen for polymerisation and also to the desired characteristics (for example, molecular weight) of the polymer. This quantity is moreover determined by taking into account the quantity of heavy metal contained on the support.

By way of indication, for example, for polymerisation in solution, the said catalytic component may be used in an amount of from 50 to 400 mg/liter of reaction solvent.

In the polymerisation process the molecular weight of the homo-or- co-polymer can also be regulated by adding to the polymerisation medium one or more chain terminating agents. The use of hydrogen is preferred but other agents such as diethylzinc and diethylcadmium, can also be used.

The catalyst of the present invention shows very high productivity and specific activity in the homo- and co-polymerisation of the olefines.

For example, in the case of the homopolymerisation of ethylene, productivity values of 1500 g of polyethylene/g catalyst/h are exceeded. Using titanium catalysts, specific activities greater than 22Kg of polyethylene/g Ti/h/atmosphere of ethylene have been obtained.

Consequently the concentration of harmful catalytic residues in the polymers produced will be negligible. All the long and costly purification processes of the polymers, can therefore be eliminated, and the polymers can be used as they are.

The invention will now be illustrated by the following experimental Examples.

EXAMPLE 1

100 g. of $Al_2(SO_4)_3 \cdot 18H_2O$ aare dissolved in 400 ml of water. The solution being maintained at a temperature of 25° C. and under agitation, there are added over a period of one hour, 300 ml of 12% by weight aqueous solution of NaOH. A suspension in which the pH reaches the value of 8.5 is thus formed. After 2 hours the gel is filtered and washed three times, with 400 ml each time, of deionized water.

The gel is then immediately dried at 120° C. for 12 hours. The alumina thus obtained has a pore volume of 1.5 ml/g, a surface area of 200 $m^2/g$ and it contains 0.20% by weight of $Na^+$ cations and 14% by weight of $SO_4^{--}$ anions.

Calcination of the alumina is carried out at 700° C. and for a period of 10 hours; this temperature is reached with a heating gradient of 50° C./h.

10g of this alumina are suspended in 60 ml of pure, liquid $TiCl_4$, and the suspension is heated under agitation, up to 120° C., the treatment being continued at this temperature for one hour. The solid reaction product is separated, washed with $TiCl_4$ and then with n-heptane until the free chlorine ions are no longer present in the washing solvent, and it is then dried.

The catalytic component thus prepared has, on analysis, a titanium content equal to 1% by weight with respect to the support.

Polymerisation is then carried out in the following manner:

0.2 g of the aforesaid catalytic component are added to 0.5 g of triethylaluminium in solution in 2000 ml of anhydrous n-heptane. The whole is then transferred into a 4000 ml autoclave fitted with an agitator.

The pressure is brought to 6 $Kg/cm^2$ by feeding in ethylene, and then to 10 $Kg/cm^2$ by feeding in hydrogen. The temperature is brought to 85° C., and kept at this value for the whole duration of polymerisation.

During polymerisation the partial pressure of ethylene is kept constant by continuous feeding of fresh ethylene.

After one hour the autoclave is voided of gas and 312 g of polyethylene are discharged, which corresponds to a yield of 1560 g of polyethylene/g catalyst/h.

The specific activity of the catalytic component, with respect to the quantity of titanium used, is 26 Kg of polyethylene/g Ti/h/atmosphere of ethylene.

EXAMPLE 2

An aluminum hydroxide gel containing $SO_4^{--}$ anions is prepared in a manner identical to that described in Example 1. The only variation is that the precipitated and filtered gel is washed at ambient temperatures with 100 ml of a 0.5% by weight aqueous solution of hydrofluoric acid.

The gel thus treated is dried at 120° C. for 12 hours. The alumina thus obtained has a pore volume of 1.3 ml/g, a surface area of 200 $m^2/g$ and it contains 0.08% by weight of $Na^+$ cations, 14% by weight of sulphate anions and 2% by weight of fluorine anions.

All the subsequent operations — calcination of the alumina, preparations of the catalytic complex and polymerisation of the ethylene, — are carried out as in Example 1.

440 g of polyethylene are obtained. The yield is 2200g of polyethylene/g catalyst/h; the specific activity of the catalytic component is 36.6 Kg of polyethylene/g Ti/h/atmosphere of ethylene.

This Example demonstrates the synergic action of the fluorine anions when they are added to the sulphate anions as constituents of the support.

EXAMPLE 3 (comparative)

100 g of $Al_2(SO_4)_3 \cdot 18 H_2O$ are dissolved in 400 ml of water. The solution being maintained at ambient temperature and under agitation, 300 ml of 12% by weight aqueous solution of NaOH are added in one hour.

A suspension is thus formed, the pH of which reaches the value of 8.5. After two hours the gel is filtered and washed repeatedly with deionized water, until the $SO_4^{--}$ anions disappear. The gel is then immediately dried at 120° C. for 12 hours.

The alumina thus obtained has a pore volume of 1.0 ml/g, a surface area of 220 m²/g and it contains 0.005% by weight of $Na^+$ cations and 0.2% by weight of $SO_4^{--}$ anions.

Calcination of the alumina and preparation of the catalytic component by treatment of the support with $TiCl_4$, are then carried out as described in Example 1. The catalytic component thus prepared has upon analysis, a titanium content equal to 1.8% by weight with respect to the support.

Polymerisation is carried out as described in Example 1, except that 0.25 g of catalytic component and 0.6 g of triethylaluminium are used; moreover, the partial pressure of the ethylene is 10 Kg/cm². The partial pressure of the hydrogen is 4 Kg/cm².

After one hour of reaction, 110g of polyethylene are obtained. The yield is 440 g of polyethylene/g catalyst/h; the specific activity of the catalytic component is 2.45 Kg of polyethylene/g Ti/h/atmosphere of ethylene.

This Example shows that by precipitating a gel of aluminium hydroxide by methods similar to those described in Example 1, but then carrying out washings of the gel so as to remove the sulphate anions, an alumina is obtained which will give a catalytic component with a considerably reduced catalytic activity.

EXAMPLE 4 (comparative)

200 g of $Al_2(SO_4)_3$ are dissolved in 4000 ml of water. The solution being maintained at a temperature of 25° C. and under agitation, a 5% by weight aqueous solution of NaOH is then added in such a quantity as to bring the pH to a value of 10.5. After 2 hours the gel is filtered and washed three times, with 400 ml each time, of deionized water. The gel is then immediately dried at 120° C. for 12 hours. The alumina thus obtained has a pore volume of 0.7 ml/g, a surface area of 300 m²/g, and it contains 2.5% by weight of $SO_4^{--}$ anions.

Calcination of the alumina and preparation of the catalytic component by treatment of the support with $TiCl_4$ are then carried out as described in Example 1. The catalytic component thus prepared has, on analysis, a titanium content equal to 2% by weight with respect to the support.

Polymerisation is carried out as described in Example 1. After one hour of reaction 90g of polyethylene are obtained. The yield is 450 g of polyethylene/g catalyst/h; the specific activity of the catalytic component is 3.75 Kg of polyethylene/g Ti/h/atmosphere of ethylene.

This Example shows that, by operating in a manner analogous to that described in Example 1, but by precipitating the aluminium hydroxide gel at a pH value which is too high, alumina is produced which gives a catalytic component with appreciably reduced catalytic activity.

EXAMPLE 5

An aqueous solution of sodium aluminate containing, for 100 g of solution, 10 g of $Al_2O_3$ and 20 g of $Na_2O$, kept at a temperature of 30° C., is admixed under agitation with a 5% by weight aqueous solution of $H_3PO_4$ in such amounts as to bring the pH of the resulting mixture to the value of 9.

After 2 hours the gel is filtered and it is washed and dried as described in Example 1.

The alumina thus obtained has a pore volume of 1.2 ml/g, a surface area of 350 m²/g, and it contains 1.8% by weight of $PO_4^{---}$ anions. Calcination of the alumina is carried out at 650° C. and for a period of 10 hours; this temperature is reached with a heating gradient of 50° C./h.

Preparation of the catalytic component by treating the support with $TiCl_4$ is then carried out as described in Example 1. The catalytic component thus prepared has, on analysis, a titanium content equal to 0.8% by weight with respect to the support.

Polymerisation is carried out as described in Example 1, except that 250mg of catalytic component are used. After one hour of reaction, 390 g of polyethylene are obtained. The yield is 1560 g of polyethylene/g catalyst/h; the specific activity of the catalytic component is 32.5 Kg of polyethylene/g Ti/h/atmosphere of ethylene.

EXAMPLE 6

5g of alumina, containing $PO_4^{---}$ anions, produced in the same way as that described in Example 5 and identical with it, are treated at 125° C., for one hour with 100 g of pure $VOCl_3$. The solid reaction product is filtered, washed with $VOCl_3$ and subsequently with n-heptane until the free chlorine ions have completely disappeared from the washing solvent, and then dried.

The catalytic component thus prepared has, on analysis, a vanadium content equal to 1.5% by weight with respect to the support.

50 mg of the said catalytic component are added to 100 mg of triisobutylaluminium in solution in anhydrous n-heptane. The whole is then transferred into an autoclave and polymerisation is carried out in a manner similar to that described in Example 1, except that a partial pressure of ethylene of 4 Kg/cm² and a partial pressure of hydrogen of 2 Kg/cm² are used.

After one hour of reaction, 105 g of polyethylene are obtained. The yield is 2100 g of polyethylene/g catalyst/h; the specific activity of the catalytic component is 35 Kg of polyethylene/g Ti/h/atmosphere of ethylene.

EXAMPLE 7 (comparative)

100 g of $Al_2(SO_4)_3 \cdot 18 H_2O$ are dissolved in one litre of water. The solution being kept at ambient temperature and under agitation, there is then added a quantity of a 2N aqueous solution of $Na_2CO_3$ such as to bring the pH to the value of 8.

The suspension produced is divided into two portions: the first portion is filtered immediately (case A), the second portion is left to mature for 6 days before it is subjected to filtration (case B).

Washing of the two filtered suspensions is carried out with deionized water, in such a manner as to leave included in the gels, in both cases, 10% by weight of $SO_4^{--}$ anions.

The characteristics of the two precipitates, after identical drying at 120° C., are as follows:

|  | Case A | Case B |
|---|---|---|
| pore volume (ml/g) | 1.5 | 0.9 |
| surface area (m²/g) | 120 | 210 |
| residual H₂O (% by weight) | 28 | 35 |
| $SO_4^{--}$ anions (% by weight) | 10 | 10 |
| $Na^+$ cations (% by weight) | 0.20 | 0.18 |

Calcination of the alumina and preparation of the catalytic component by treatment of the support with $TiCl_4$ are then carried out, in both these cases, as described in Example 1.

The two catalytic components thus prepared have, on analysis, a titanium content equal, respectively, to 1.1% by weight with respect to the support (case A), and 1.9% by weight with respect to the support (case B).

Polymerisation is carried out, in both cases, as described in Example 1.

The resultant yield and specific activity are as follows:

|  | Case A | Case B |
|---|---|---|
| yield in g of polyethylene/g catalyst/h | 1500 | 640 |
| specific activity in Kg of polyethylene/g Ti/h/atmosphere of ethylene | 22.7 | 5.6 |

This Example shows that by leaving the aluminium hydroxide gel to mature for a long period in its mother liquors there is then produced an alumina which, other preparation conditions being left unchanged, furnishes a catalytic component of appreciably reduced catalytic activity.

What we claim is:

1. In a Ziegler catalytic system formed by the combination of an organo-metallic compound of a metal of Group I, II or III of the Periodic System of the Elements according to Mendeleef and a compound of a heavy metal of Group IV, V or Vi of said Periodic System supported on an alumina carrier, the improvement wherein the carrier is essentially an activated amorphous alumina containing from 0.3 to 30% by weight of one or more salts of aluminum with at least one oxygenated inorganic anion selected from the group consisting of sulphate, phosphate, chlorate, perchlorate and halogen-sulphonate anions or of a mixture of the latter with one or more salts of aluminum with halogen anions, said activated amorphous alumina being prepared by precipitating aluminum hydroxide gel from a solution of aluminum salt at a pH value of from 7 to 10, introducing said inorganic anions into said gel by co-precipitation with and/or further addition to the latter, in such conditions as to ensure in the alumina content of inorganic anions of from 0.2 to 25% by weight and a content of cations other than aluminum of less than 0.25% by weight, the permanence time of the gel under moist conditions being less than 12 hours, drying the gel and activating the resulting amorphous alumina by calcination at a temperature of from 250° to 700° C.

2. The catalytic system of claim 1, wherein said further addition to the gel is carried out by contacting said gel with one or more acid solutions of the inorganic anions.

3. The catalytic system of claim 1, wherein said aluminum hydroxide gel is precipitated at a pH value of from 7.5 to 8.5.

4. The catalytic system of claim 1, wherein said heavy metal is selected from the group consisting of titanium, vanadium and chromium.

5. The catalytic system of claim 1, wherein said compound of a heavy metal is selected from the group consisting of halides, oxyhalides and alkoxyhalides.

6. The catalytic system of claim 1, wherein said compound of a heavy metal is titanium tetrachloride.

7. The catalytic system of claim 1, wherein said organo-metallic compound is selected from the group consisting of alkylaluminum compounds and alkylaluminum halides.

8. The catalytic system of claim 1, wherein said organo-metallic compound is selected from the group consisting of triethylaluminum and triisobutylaluminum.

* * * * *